United States Patent

[11] 3,540,569

[72] Inventors  Guthrie B. Stone
               Honeoye;
               Roger A. Herington, Dansville; Ronald K.
               Allen, Springwater, New York
[21] Appl. No. 782,794
[22] Filed     Dec. 5, 1968
[45] Patented  Nov. 17, 1970
[73] Assignee  By mesne assignments to Thrifty-Lifty
               Inc., a corporation of New York

[54] BUCKET ELEVATOR HOPPER
     8 Claims, 3 Drawing Figs.
[52] U.S. Cl. .................................................. 198/55
[51] Int. Cl. ............................................. B65g 47/18
[50] Field of Search ..................................... 198/47, 53,
                                                         55, 140

[56]            References Cited
            UNITED STATES PATENTS
2,557,623  6/1951  Wenner......................  198/53
2,581,720  1/1952  Schulte.......................  198/53

Primary Examiner—Richard E. Aegerter
Assistant Examiner—Alfred N. Goodman
Attorney—O'Brien and Jacobson ABSTRACT: A loading hopper attachment for a conveyor of the bucket elevator type adapted to accommodate either fine or coarse bulk abrasive materials having a material restraining means within the container portion thereof and which includes cooperating elements for guiding the buckets and for preventing wedging or jamming of the coarser materials.

Patented Nov. 17, 1970

3,540,569

INVENTOR
GUTHRIE B. STONE
ROGER A. HERINGTON
RONALD K. ALLEN

BY

Albert A. Maharsel
ATTORNEY

BUCKET ELEVATOR HOPPER

BACKGROUND OF THE INVENTION

The invention relates to a hopper attachment for elevator conveyors of the open bucket type which are adapted to convey bulk materials such as sand or coarse materials such as stones from one level to another.

This type of conveyor is commonly provided with a material loading hopper into which the material to be conveyed is placed and is so shaped so as to funnel said material in the direction of the open buckets adapted to receive and carry the material. The buckets are normally carried in equally spaced relation on an endless belt, which is caused to move about an elongated conveyor frame by means of rotatable pulleys carried on each end of said frame. The hoppers are usually positioned adjacent the base of the framework in aligned and spaced relation to the bucket carrying belt. Skirts or side walls extend from the hopper into close proximity with the belt and as well as forming a guide channel for the buckets, they serve to confine the material for pick up by each bucket as it passes the position of alignment with said hopper.

Prior to the instant invention, this type of conveyor was quite restricted relative to the variety of material which could be handled thereby. The hoppers could be easily adjusted for handling fine materials such as sand or the like; however, coarser materials such as small stones create a jamming condition by becoming wedged between the side walls or skirts and the sides of the buckets. Should these conveyors be set up with more clearance between the various components of the hopper and the buckets so as to accommodate coarser materials, it would not be feasible to utilize it for finer materials, for excessive amounts of the latter would simply drop past the buckets and accumulate in hindering amounts at the base of the conveyor.

The loading hopper attachment according to the instant invention when assembled to an open bucket elevator type conveyor provides a conveying apparatus which is capable of handling either fine or coarse materials. The attachment includes means for preventing loss of the fine materials and a further means for preventing jamming due to the coarser materials becoming wedged between the buckets and the cooperating skirts of the hopper. Additionally the top edge of the loading portion of the hopper is disposed at a minimum distance above the base of the conveyor to facilitate loading, and a guide means is provided for automatically aligning the belt and buckets attached thereto prior to moving into the material receiving portion of the hopper.

SUMMARY OF THE INVENTION

The bucket elevator hopper of the present invention is adapted to assemble adjacent the base of the supporting frame of an open bucket type elevator conveyor. The hopper assembles in spaced and aligned relation to the belt which carries the material pickup buckets. Skirts or side walls of sheetlike resilient material extend from the hopper into close proximity with the upper side surfaces of the belt to define a channel through which the bucket members are caused to move. These sides of the buckets, as they move through the channel, are also in close proximity with the skirts and serve a dual purpose, one being to maintain fine materials within a given area and also eliminate wedging of coarser materials between the buckets and side walls. Should the coarser materials become wedged as described, the resilient skirts simply bulge outwardly to prevent a jamming condition. Additionally the hopper includes a resilient flapper member which extends into the path of the buckets and serves to prevent the conveying material from dropping past the buckets. A guide means is provided at the base of the conveyor and provides a means for aligning the belt and buckets thereon for movement through the channel.

DESCRIPTION OF THE PREFERRED EMBODIMENT

Figure 1:
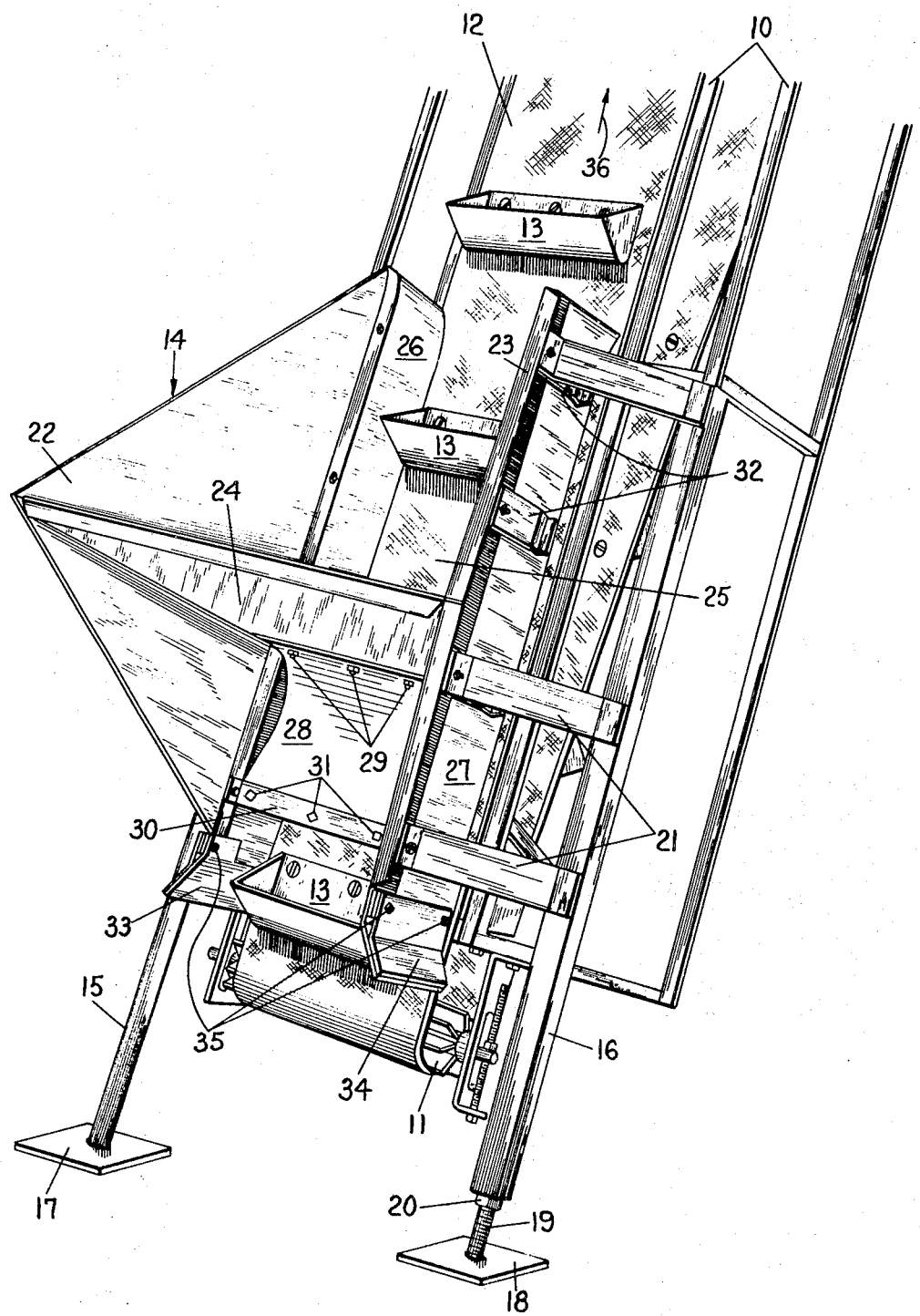
FIG. 1 is a perspective view of the lower portion of an open bucket elevator type conveyor showing the loading hopper according to the invention applied thereto.

Referring to the drawings wherein only as much of conventional bucket elevator type conveyor structure is depicted as is necessary to a complete understanding of the invention, there is shown a supporting frame 10 having a pulley 11 rotatably and adjustably mounted at one end of said frame. The opposite end of the frame (not shown) is provided with a similar pulley that is driven by any suitable source of power and provides a means for moving an endless belt 12 on said pulleys and about the longitudinal extent of the supporting frame 10.

A plurality of buckets 13 are fixedly attached, in equally spaced relation, to the outer surface of the endless belt 12 and serve in a well known manner as a means for picking up and moving various bulk materials from one level to another.

Figure 2:
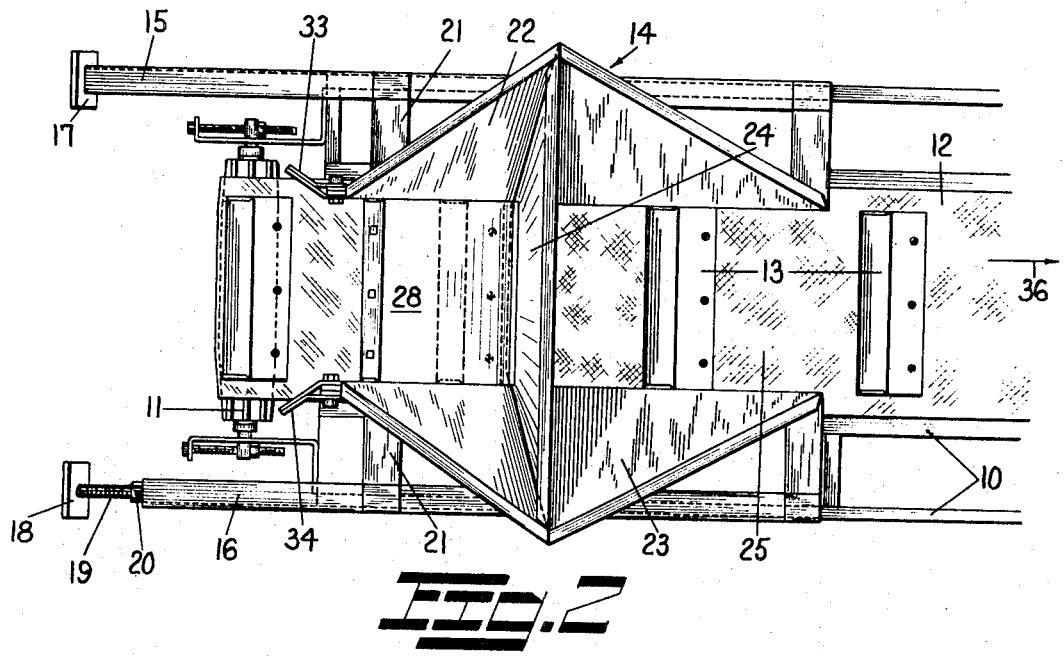
FIG. 2 is a plan view of the conveying apparatus shown in FIG. 1.
Figure 3:
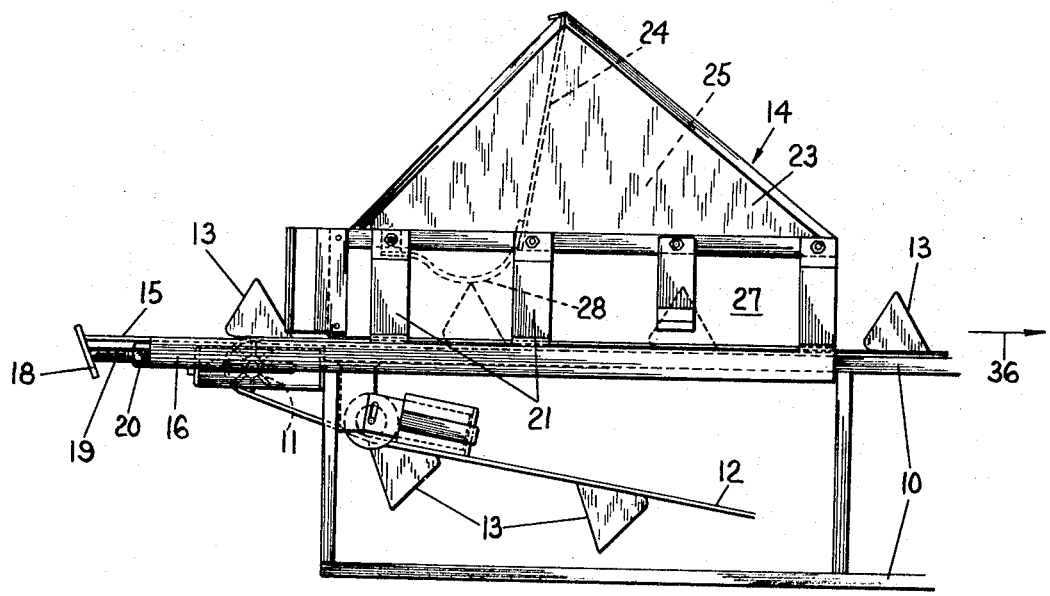
FIG. 3 is a view in side elevation of the conveying unit shown in FIGS. 1 and 2.

The bucket elevator hopper according to the invention is identified generally in FIGS. 1, 2 and 3 by numeral 14. This hopper includes a pair of spaced leg members 15 and 16 having stabilizing foot members 17 and 18 respectively attached to the lower most ends thereof. Foot member 18 is adjustably attached to leg 16 by means of a threaded screw 19 and check nut 20, and serves to facilitate positioning the conveyor in operating position as well as to provide sufficient bucket clearance at the lower end of the supporting frame 10.

Leg members 15 and 16 are removably attached, by any suitable means, to the lower side portions of the supporting frame 10 and each includes spaced support brackets 21. These support brackets are fixed to their respective leg members, and extending angularly upward and inwardly they are disposed in such a manner that the brackets on one leg member are positioned in spaced and opposed relation to the brackets of the other leg member.

The support brackets have fixed to their upper ends outwardly flared hopper plate members 22 and 23. Hopper plate member 22 is supported by the brackets 21 which are fixed to leg member 15 and the plate member 23 is supported by brackets 21 which are fixed to leg member 16.

A web 24 interconnects the flared hopper plate members at a point intermediate their ends and defines a funneled opening 25 into which the material to be conveyed is loaded.

Side wall skirts 26 and 27 are attached to the lower edge of the hopper plate members 22 and 23 respectively and they extend from the latter into close proximity with the upper surface of the endless belt and adjacent each edge thereof (FIGS. 1 and 3). These side wall skirts are fabricated from a flexible resilient material such as rubber or the like and being disposed in spaced relation they form a channel through which the buckets 13 are caused to pass.

The web 24 has fixed to its lower end a flapper member 28 which is formed from deformable sheet material. This flapper member has one end attached to the lower edge of the web 24 by means of bolts 29 (FIG. 1) and extending in arcuated configuration into bucket engaging position within the channel, the opposite end is fixed to a support bar 30 by means of bolts 31.

Extending in the direction of the endless belt 12, each of the flared hopper plate members 22 and 23 has a plurality of spaced leaf spring retainers 32 fixed to the lower edge thereof. A greater portion of the length of the leaf spring retainers are in contact with the outer surface of the side wall skirts and are effective in maintaining the latter in a plane generally normal to the direction of movement of the endless belt 12.

Both of the side wall skirts 26 and 27 are provided on the lower ends thereof with outwardly flared guide plate members which are identified by numerals 33 and 34 respectively (FIGS. 1 and 2). These guide plate members are attached to their respective side wall skirts by means of bolts 35 and serve as a means for aligning the buckets 13 for centralized movement through the channel formed by the side wall skirts 26 and 27.

In operation the endless belt is caused to move in the direction of the indicating arrow 36 shown in FIGS. 1, 2 and 3 and either fine or coarse bulk abrasive material is adapted to be loaded into the funneled opening 25 of the bucket elevator hopper 14. As the endless belt moves in the direction indicated, the buckets 13 carried thereby make contact with the arcuated portion of the flapper member 28. If fine material is loaded into the hopper, such as sand, the flapper member is effective in restraining the material within a given area for pickup by the buckets and prevents said material from dropping past said buckets onto the ground or floor to accumulate at the base of the conveyor.

If coarse materials are loaded into the hopper, such as stones, the flapper member also prevents this material from dropping past the buckets, and the flexible resilient material from which the side wall skirts are fabricated prevent any possibility of the coarse material wedging or becoming jammed between said skirts and the adjacent sides of the buckets 13.

We claim:

1. A loading hopper for a conveyor of the bucket elevator type having a supporting frame, pulley members rotatably mounted at each end of said frame with driving means for rotating at least one of said pulleys, an endless belt disposed about and movable by said pulleys and including a plurality of bucket members fixed to and equally spaced about said belt, said loading hopper comprising:
   a. spaced leg members fixedly attached to one end of said supporting frame;
   b. angularly and oppositely disposed support brackets fixed to each of said leg members;
   c. hopper plate members carried by said support brackets in spaced relation above said belt;
   d. a web interconnecting said hopper plate members intermediate their ends forming a receptacle for receiving materials to be conveyed by said buckets;
   e. side wall skirts depending from each of said hopper plate elements into close proximity with said belt defining a channel through which said buckets are adapted to travel; and
   f. guide means forming one end of each said sidewall skirts for aligning said buckets for movement there between.

2. The loading hopper according to claim 1 wherein at least one of said leg members is longitudinally adjustable for positioning the conveyor and providing clearance for the buckets as they pass about the lower end of said supporting frame.

3. The loading hopper according to claim 1 wherein said web is provided with a means adapted to cooperate with said buckets as they move through the channel to prevent conveying material in the receptacle from dropping past said buckets.

4. The loading hopper according to claim 3 wherein said means comprises a flapper member of deformable sheet material extending in arcuated configuration into said channel and having one side fixed to said web and the opposite to a support bar that interconnects said hopper plate members.

5. The loading hopper according to claim 1 wherein said hopper plate members are flared outwardly from the depending skirts attached thereto for funneling the material to be conveyed in the direction of said belt and bucket members.

6. The loading hopper according to claim 1 wherein said side wall skirts are formed from resilient sheet material with said hopper plate member including cooperating means for continually urging said wall skirts to a position normal to the plane of movement of said belt through said channel.

7. The loading hopper according to claim 6 wherein said cooperating means comprises leaf spring members disposed in spaced relation along the length of said hopper plate members with the greater portion of their length being in abutting relation with the outer surfaces of said side wall skirts.

8. The loading hopper according to claim 1 wherein said guide means comprises outwardly flared guide plate members forming a funneled entrance for said buckets into said channel.